United States Patent [19]

Mercier

[11] 4,192,350

[45] Mar. 11, 1980

[54] PRESSURE VESSEL

[75] Inventor: Jacques H. Mercier, Paris, France

[73] Assignee: Normand Trust, New York, N.Y.

[21] Appl. No.: 963,678

[22] Filed: Nov. 27, 1978

[30] Foreign Application Priority Data

Dec. 22, 1977 [FR] France ............................... 77 38738

[51] Int. Cl.² ............................................ F16L 55/04

[52] U.S. Cl. ..................................................... 138/30

[58] Field of Search ............................ 138/26, 30, 31; 220/85 B

[56] References Cited

U.S. PATENT DOCUMENTS

| | | | |
|---|---|---|---|
| 2,345,124 | 3/1944 | Huber | 138/30 |
| 3,137,317 | 6/1964 | Peters | 138/30 |
| 3,195,576 | 7/1965 | Mercier | 138/30 |
| 3,674,054 | 7/1972 | Mercier | 138/30 |
| 3,929,163 | 12/1975 | Schon | 138/30 |
| 4,117,866 | 10/1978 | Bohm et al. | 138/30 |

FOREIGN PATENT DOCUMENTS

| | | | |
|---|---|---|---|
| 2242942 | 3/1974 | Fed. Rep. of Germany | 138/30 |
| 2419557 | 6/1975 | Fed. Rep. of Germany | 138/30 |
| 2253933 | 4/1975 | France | 138/30 |

*Primary Examiner*—Richard E. Aegerter
*Assistant Examiner*—James E. Bryant, III
*Attorney, Agent, or Firm*—Arthur B. Colvin

[57] ABSTRACT

A pressure vessel comprising a casing or container formed from two substantially cup-shaped shells, each of said shells having their free edges or rims located in juxtaposition by means of an internal annular retainer member which properly spaces such free edges to permit connection thereof by an annular weld and which also serves as the support for a deformable partition positioned in the container. The retainer member formed from a metal having a melting point below that of the shells has a first thickened annular portion of relatively great mass on one side of said annular weld and a second annular portion of smaller mass on the other side of said annular weld, said annular portions having outer surfaces in intimate contact with the inner surface of the casing and define two annular contact zones separated by an intervening zone in which the weld is formed, said deformable partition being supported by said retainer member at the edge of said first annular portion remote from the annular weld.

Two cup-shaped shells have their edges or rims in juxtaposition to be retained together by welding, it is important that the welding metal engage the entire thickness of the juxtaposed rims in order to provide a dependable bond.

17 Claims, 4 Drawing Figures

PRESSURE VESSEL

Figure 1:
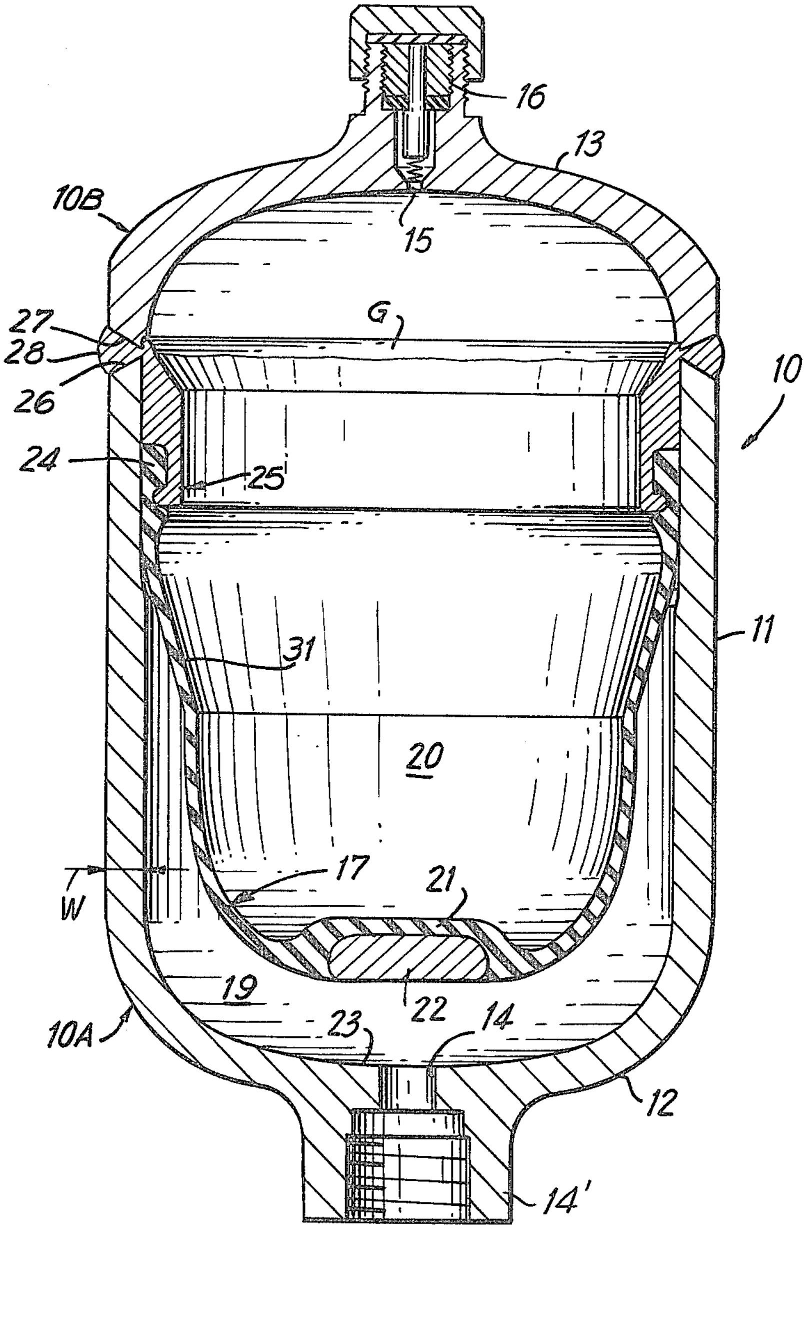

It is also important that the two shells of the container be properly positioned with respect to each other at the time of the welding operation which is generally performed by rotating the juxtaposed shells in front of a welding device. Such positioning requires not only that the two shells be axially aligned, but also that a slight axial clearance be provided between the rims of the shells so that the welding metal will completely fill the space therebetween to permit the metal to bond to the entire juxtaposed surfaces of such rims.

It is also essential that the deformable partition which is positioned in the container to provide a gas chamber and an oil chamber therein in communication respectively with orifices or ports formed in the ends of the container, be securly retained inside the container formed after the welding operation, with no damage being imparted to the material of the partition as a result of the heat given off by the welding operation.

In known pressure vessels of this type, i.e., in the pressure vessel described in U.S. Pat. No. 3,195,576, special precautions must be taken to avoid damaging the deformable partition by the heat resulting from the welding operation. For example, the pressure vessel may be cooled by liquid or encircled by a heat sink in the proximity of the weld during the welding operation to prevent the heat released during the welding operation from damaging the rim of the deformable partition supported by the retainer member. These precautions increase the manufacturing costs. Moreover, the retainer member hinders by its very presence, the verification that the weld extends to the correct depth.

In order to reduce these inconveniences, it has already been suggested, particularly in U.S. Pat. No. 3,674,054 to provide a cavity and a plurality of holes in the retainer member opposite the weld.

This cavity and these holes have the effect of permitting the dissipation of heat by convection into the interior of the pressure vessel. However, the cavity reduces the interface or intimate contact between the retainer member and the casing, which reduces dissipation of the heat by conduction.

While the cavity and the holes provide visual access to parts of the weld from the interior of the pressure vessel, permitting inspection of the quality of the weld, this checking is only partial since the number and size of the holes are necessarily small, precluding observation of the majority of the weld region.

It is accordingly among the objects of the invention to provide a pressure vessel of the above type which has relatively few parts, which may readily be assembled in a minimum of time with the assurance that the adjacent rims of the shells forming the pressure vessel be properly spaced and located to insure that a dependable bond will be formed and which will insure that a minimum of heat will be transmitted during the weld operation to the deformable partition positioned in the container and also that the region of the shells where the welding operation is performed will not be deformed by excessive heat which may cause improper retention of the deformable partition.

According to the invention, the pressure vessel comprises two substantially cup shaped shells defining a casing, each having an orifice or port in its closed end, the rims of said shells being properly located and retained in juxtaposition by means of an annular retainer member positioned in the container or casing formed by the juxtaposed shells, so that the container may be rotated and a dependable welding operation may be performed in the space between the rims of the shells, which space defines an intervening zone. The annular retainer member has a first thickened annular portion of relatively great mean thickness and mass and a second thickened annular portion of smaller mean thickness and mass, the outer surfaces of said annular portions being in intimate contact with the inner surface of the casing, said first and second annular portions defining a first and second contact zone, the second annular portion being aligned with said intervening zone.

The deformable partition which is positioned inside the casing and is interposed between the said orifices or ports defining two fluid chambers of variable volume, preferably comprises a bladder having a closed end and a mouth defining a thickened annular flange, said flanged mouth of the bladder being mounted on said retainer member in the casing body and being pressed against the inner surface thereof and more particularly the flanged mouth of the deformable partition is mounted on the portion of the retainer member having the greater mean thickness and mass.

The retainer member thus connects the adjacent rims of the shell and furthermore provides for dissipation of the heat resulting from the welding operation.

In order further to increase the dissipation of heat by mass action, it is desirable that the contact between the retainer member and the inner wall of the pressure vessel be as great as possible and, according to another characteristic of the invention, the two shells of the pressure vessel defining the casing preferably have an inner diameter adapted to receive the retainer member preferably by force fit.

Figure 2:
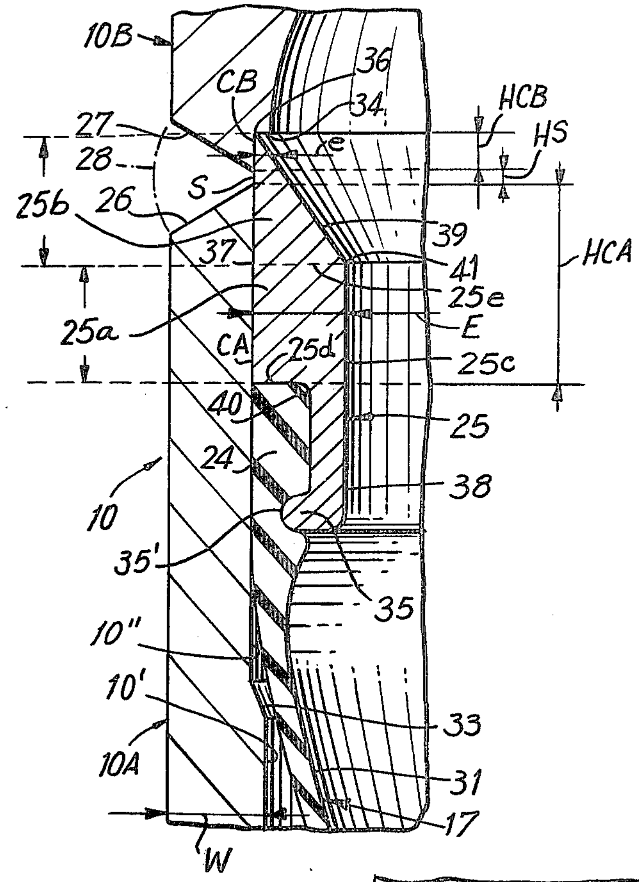
Figure 3:
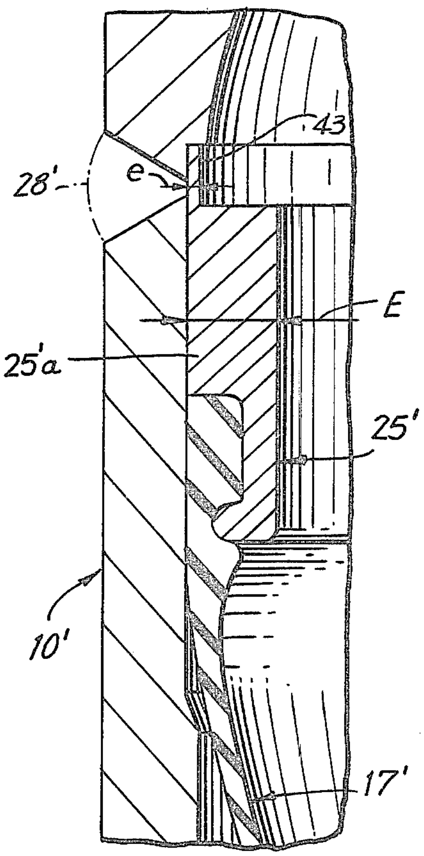
Figure 4:
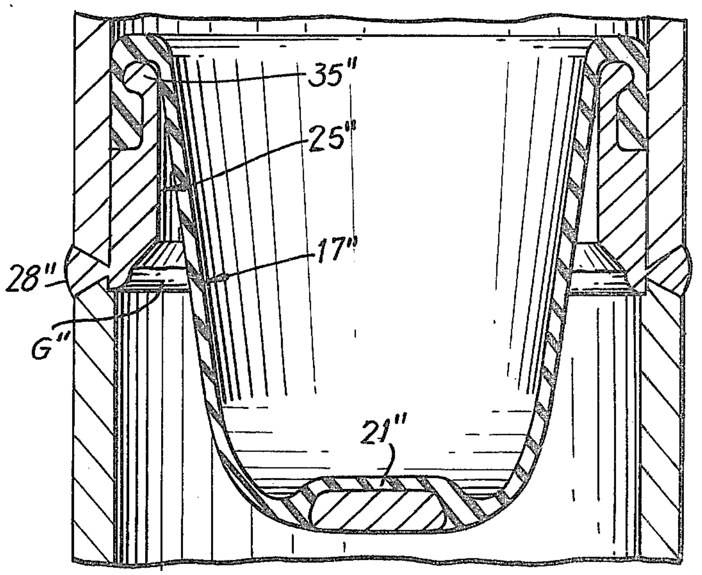

In the accompanying drawings in which are shown one or more of various possible embodiments of the several features of the invention;

FIG. 1 is a longitudinal cross sectional view of a pressure vessel incorporating the invention herein after the welding operation, FIG. 2 is a detail view on a larger scale of the retainer member of FIG. 1 and the adjacent portion of the casing before the welding operation, FIG. 3 is a view similar to FIG. 2 of another embodiment of the retainer member, and FIG. 4 is a view similar to FIG. 2 of a further embodiment.

Referring now to the drawings, the invention is incorporated in a pressure accumulator which, as shown in FIG. 1, comprises a container or casing 10 of rigid metal capable of withstanding relatively high pressures.

The container comprises two complementary cup-shaped shells 10A and 10B, the latter comprising the cap or cover member of the former, which defines the body portion of the accumulator. The rims 26 and 27 of the shells 10A and 10B are secured together by an annular weld joint 28. As shown in the drawings, the space between the rims 26 and 27 is preferably triangular and is formed by beveling the rims 26, 27 with the inner edges of said rims being in close proximity, the space therebetween defining the intervening zone S.

Each of the shells 10A and 10B has a rounded end 12 and 13 so that the accumulator is a substantially cylindrical unit, i.e., it has a cylindrical body portion 11 with substantially hemispherical ends 12, 13, each of which has an orifice or port 14, 15, which are axially aligned. The port 15 is adapted to receive a suitable gas valve 16 and the port 14 has associated therewith and extending axially outward therefrom a cylindrical sleeve 14', illustratively formed integrally with the rounded end 12, said sleeve 14' being internally threaded and adapted to receive a suitable coupling.

Positioned in the container 10 and particularly in the cup-shaped shell 10A, is a deformable partition or separator 17 which may be of rubber or of a material having like characteristics. The partition illustratively is a bladder having an enlarged mouth 24 which is thickened to form an annular flange. The bladder divides the container 10 into two chambers or compartments, i.e., a gas chamber 20 in communication with port 15 and a liquid or oil chamber 19 in communication with port 14.

The chamber 20 is adapted to be charged with gas under pressure through valve 16 and chamber 19 is adapted to receive a liquid such as oil through the port 14 which is adapted to be connected through sleeve 14' to the hydraulic system in which the accumulator is incorporated.

The port 14 is designed to be closed by a valve member 22 which cooperates with a valve seat 23 defined by the periphery of port 14 in the rounded end 12 of shell 10A. The valve member 22 preferably is a button, for example of steel or aluminum, molded in the closed end 21 of bladder 17.

The bladder 17 extends form its closed end 21, widening in generally conical form as at 31 up to the thickened mouth or flange 24.

The bladder 17 is retained in the container defined by shells 10A and 10B, by means of an annular retainer member 25 which is located substantially in transverse alignment with the portion of the cylindrical body portion 11 of shell 10A adjacent the rim 26 thereof.

The annular retainer member 25 is of rigid material such as steel and as shown in FIG. 2 which illustrates the device before the welding operation is performed, the retainer member 25 in cross section has a first relatively thick annular rectangular portion of great mass illustratively shown at **25*a* between the broken lines and a second annular portion in the form of a right angle triangle of smaller thickness and mass extending longitudinally therefrom illustratively shown at 25*b*** between the broken lines.

In order to support the bladder 17, the thickened annular portion **25*a* of the retainer member 25 has an annular leg 38 extending longitudinally from the inner surface 25*c* of portion 25*a* and formed integral thereunder, the free end of said leg 38, having an annular transversely outwardly extending rounded lip 35 which defines an annular groove 40 with respect to the opposed end 25*d* of annular portion 25*a*, the width of lip 35 being less than that of end 25*d*, the free end of lip 35 being rounded as at 35'**.

More particularly, the inner surface of leg 38 is cylindrical and forms a continuation of the cylindrical inner surface **25*c* of annular portion 25*a*. The inner surface 39 which defines the hypoteneuse of triangular annular portion 25*b* forms an acute angle at 41 of 30 degrees with respect to end 25*e* of annular portion 25*a* and terminates in a sharp edge 36 at the apex of said triangular portion 25*b*.**

The outer surface 37 of the retainer member, defined by annular portions **25*a* and 25*b* is substantially cylindrical and the annular groove 40 is defined adjacent the end of the retainer member 25 remote from the apex 36 of the triangular portion 25*b*.**

In assembling the pressure accumulator before the weld joint 28 is formed, the flanged mouth 24 of the bladder 17 is positioned so as to encompass the annular groove 40. Due to the fact that the inner diameter of the flanged mouth 24 of the bladder is slightly less than the outer diameter of the leg 38, the mouth 24 of the bladder 17 will fit snugly around such leg in groove 40.

The annular retainer member 25 with the flanged mouth 24 of the bladder encompassing the end of the leg 38 is positioned in the mouth of the shell 10B so that the sharp edge 36 of the retainer member 25 rests against seat 34 defined by an internal annular notch adjacent inclined lip 27. The retainer member, which has an outer diameter substantially the same as the inner diameter of cup-shaped shell 10A adjacent rim 26 thereof, and with the shell 10B mounted thereon, is then forced into shell 10A by exerting axial pressure on end 13 of the shell 10B until the bevelled rims 26, 27 are spaced from each other by a predetermined distance HS, at which time the region of triangular portion **25*b* of the retainer member 25 adjacent the apex 36 thereof protrudes outwardly beyond the inner edge of beveled rim 26 of shell 10A, and the ports 14, 15** will be in axial alignment.

The force fit of retainer member 25 in the shell 10A' will cause a compressive stress in the retainer member 25 tending to insure the desired close contact. However, due to the mechanical resistance of the retainer member 25, resulting from its relatively great mass and geometry, the compressive stress to which it is subjected during its force fit into shell 10A will not cause it to be deformed. Clearly, such deformation would be undesirable for it would reduce the intimate contact between the cylindrical outer surface of the retainer member and the inner wall surface of the shell 10A, which is desirable.

With the retainer member 25 and the bladder 17 mounted thereon, thus forced into the shell 10A, it is apparent that the flanged mouth 24 of the bladder will be deformed so as to flow around the rounded end 35' of lip 35 as shown in FIG. 2. As such rounded end 35' is spaced inwardly from the inner surface of casing 10 to accommodate the bladder material, a dependable gas and liquid-tight seal will be defined between the outer surface of the flange 24 and the adjacent inner surface of the shell 10A as well as in the region adjacent the rounded end 35' of the retainer member.

In order to prevent sharp folds in the bladder adjacent the flanged portion 24 thereof clamped by the retainer member 25 against the inner surface of the casing 10, it is to be noted that such inner surface has a reduced diameter portion 10' as shown in FIG. 2, which is joined to the enlarged diameter portion 10" of the casing by an inclined annular region 33.

As thus assembled, a first annular contact zone CA having a height HCA and a mean thickness E, will be defined between the portion of the cylindrical outer surface 37 of the retainer member between the end **25*d* of annular portion 25*a* and the inner edge of beveled rim 26 and the inner surface of the shell 10A engaged thereby. A second annular contact zone CB, having a height HCB and a mean thickness e much smaller than mean thickness E, will be defined between the apex 36 and the inner edge of beveled rim 27 and the inner surface of shell 10B engaged thereby. The exposed portion of the outer surface 37 of the retainer member between the inner ends of the beveled rims 26, 27** defines the intervening zone S, having a height HS.

In the embodiments shown to illustrate the invention, the thickness E is at least equal to the thickness W of the wall of the shell 10A. In any event, the mass of the portion 25*a* with the greatest mean thickness E is selected to be sufficiently large to dissipate a sufficient amount of heat released by welding so that the temperature in the vicinity of the mouth 24 of the bladder remains compatible with the tightness of the seal between the bladder and the retainer member. More particularly, the heat formed by the welding operation will be dissipated through the thickened mass of the retainer member and will not cause injury to the flanged mouth 24 of the bladder or to the adjacent portion of the shell.

Preferably, in order to increase the dissipation of heat by mass action, between the welding region and the region where the mouth of the bladder is attached, the thickness E of the first annular portion 25*a* of the retainer member which supports the mouth of the bladder, preferably is in the order of 3 to 4 times the thickness e of the second annular portion 25*b* of the retainer member.

More particularly, the thickness e is between 5 and 40%, particularly between 10 and 30% and preferably close to 25% of the thickness E. The height or length HCA of the first contact zone CA is between two and ten times, preferably close to five times the height HCB of the second contact zone CB and in the order of two to three times the thickness E, while the height HCB of the second contact zone is between one and five times, preferably close to three times the height HS of the intervening zone S.

After the elements of the accumulator as assembled as above described, the casing is mounted on a suitable jig and slowly rotated while at the same time applying welding material to the region between beveled rims 26, 27. Such welding material will fill the space between such rims and the heat of the weld will melt the relatively thin pointed upper end of the retainer member 25 having the thickness e which tends to amalgamate at G (FIG. 1) with the welding band 28, the retainer member being selected of a metal whose melting point is below that of the shells.

The heat developed by welding dissipates easily by conduction due to mass action, due to the relatively large height HCA and the relatively great thickness E and also due to the totally continuous close application of retaining member 25 with the cylindrical portion 11 of the casing. Thus, the heat will dissipate not only into the retainer member due to its great mass, but also will flow into the shells 10A and 10B and in addition the heat is allowed to dissipate by convection into the interior of the casing 10 due to the meling and consequent removal of the thin pointed end of retainer member 25 with the mean thickness e. As a result of such transfer of heat, the flanged end 25 of the bladder will be substantially unaffected and hence will remain intact.

Due to the melting of the thin end of the retainer member 25, dissipation of heat by convection toward the interior of casing 10 will occur and the weld can be seen from the interior of the container by the use of a suitable device passed through say, the gas port 15, prior to insertion of valve 16 therein. As an alternative method of inspection, samplings of completed units from a large run can be taken and the units can be cut in a vertical cross section to permit inspection of the weld joint. This permits inspection of the interior of the vessel to determine that there is a complete annular weld at G as shown in FIG. 1. Thereupon, the gas valve 16 is inserted into port 15 to complete the assembly.

In operation of the pressure accumulator above described, the sleeve 14′ is connected to the hydraulic system and gas under pressure is forced through valve 16 and port 15 into the gas chamber 20 to precharge the bladder 17 so that it expands to engage the inner surface of the container, the valve 22 moving against seat 23 to prevent extrusion of the bladder 17.

Thereupon a valve (not shown) interposed between sleeve 14′ and the hydraulic system is opened to permit flow of oil into the chamber 19 to charge the accumulator and compress the bladder 17 and the gas in chamber 20.

When the pressure in the hydraulic system is less than that in the accumulator, the compressed bladder will expand so that the oil in chamber 19 will be forced out of port 14 and 14′.

The embodiment shown in FIG. 3 is similar in many respects to the embodiment shown in FIGS. 1 and 2 and corresponding parts have the same reference numerals primed.

In the embodiment of FIG. 3, the second annular portion of triangular cross section is replaced by an annular lip 43, having a mean thickness "e" rising from the outer edge of the front annular portion 25′*a*, which has a mean thickness "E".

In the embodiments of FIGS. 1 and 2 and FIG. 3, the bladder 17, 17′ is mounted on the retainer member 25, 25′ at the end of the latter closest to the closed end 21 of the bladder.

In the embodiment of FIG. 4 which is substantially identical to the embodiment of FIGS. 1 and 2, corresponding elements have the same reference numbers double primed.

In FIG. 4, the bladder 17″ is mounted on retainer member 25″ at the end 35″ of the latter which is farthest away from the closed end 21″ of the bladder 17″.

It is important in devices of the type described, that three regions be isolated from each other: first, between the atmosphere and the gas which is accomplished by the weld; second, between the atmosphere and the liquid, which is also accomplished by the weld; and third, between the gas and the liquid which is accomplished by the mounting of the mouth of the bladder on the retainer member. This latter isolation is generally considered the most difficult to satisfy and it will be appreciated that the invention provides for protection of the mouth of the bladder and the surface of the casing with which the retainer member is in intimate contact, from any damage by the heat released by welding, thus insuring that the desired isolation between the gas and liquid will be achieved.

When the liquid used makes protection of the inner wall of the casing desirable, the latter is generally provided with a protective coating, for example, of epoxy resin. This coating is applied to the portion of the casing exposed to the liquid before the assembly and welding operations are performed. Such coating is susceptible of being damaged by excessive temperature. However, due to the arrangement, according to the invention, of a retainer member with a portion of smaller mean thickness e adapted to melt with the weld, and with the heat dissipating portion with a greater mean thickness E for mounting the bladder without the risk of damaging the latter by the heat generated during the welding operation, it is of little importance that the protective coating is burnt in the area of the weld zone. This is due to the fact that the liquid does not impinge on such weld zone inasmuch as the mounted flanged portion 24 of the bladder presses tightly against the inner wall surface of the casing, defining a liquid and gas tight sealing region which prevents the liquid from reaching the weld zone and hence the bladder and the adjacent portion of the casing remain undamaged.

Having thus described my invention, what I claim as new and desire to be secured by Letters Patent of the United States is:

1. In a pressure vessel comprising a casing of rigid metallic material having a body with two closed ends, each said closed end having a port, said ports being in axial alignment, a deformable separator in said casing interposed between said ports to define two fluid chambers of variable volumes, said deformable separator comprising a bladder having a closed end and a mouth forming a flange, an annular metallic retainer member secured to the inside of the casing, said mouth of said bladder being mounted on said retainer member, said casing comprising a first and second shell arranged opposite each other, each said shell comprising one of the said ends of said casing, said shells each including a cylindrical open end terminating in an annular rim, said open ends of said shells being mounted in opposite directions over said retainer member and intimately contacting the latter, to define respectively a first and a second annular contact zone delimited by said rim; the improvement comprising said first and second zones being separated by an annular intervening zone in which a portion of the said retainer member is exposed, an annular welding band extending along said rim of the said shells and said intervening zone to connect said rims and said retaining member, said pressure vessel being further characterized in that the retainer member is formed from a metal having a melting point below that of said shells and has a first portion with a relatively large mean thickness in the area of said first annular contact zone, and a second portion with a smaller mean thickness in the area of said second annular contact zone and of said intervening zone, the mouth of the bladder being mounted on the retainer member at a position on the same side of said intervening zone as said first annular contact zone.

2. A pressure vessel according to claim 1, characterized in that the mass of said portion of the retainer member with the relatively large mean thickness is sufficient to dissipate the heat released by welding to a degree sufficient to preclude injury to the mouth of said bladder mounted on said retainer member.

3. A pressure vessel according to claim 1 characterized in that the thickness of the said portion of the retainer member with the smaller mean thickness is between about 5 and 40% of the thickness of said portion of the retainer member with the relatively large thickness.

4. A pressure vessel in accordance with claim 3 wherein the thickness of said portion of said retainer member having the smaller mean thickness is between 10 and 30% of the thickness of said portion having the relatively large mean thickness, and constitutes preferably about 25% of said thickness.

5. A pressure vessel according to claim 1, characterized in that the height of the first annular contact zone is greater than the height of the second annular contact zone.

6. A pressure vessel according to claim 5 characterized in that the height of the first annular contact zone is of the order of two to three times the thickness of the first annular contact zone.

7. A pressure vessel according to claim 6, characterized in that the height of the first annular contact zone is between two and ten times, and preferably close to five times the height of the second annular contact zone.

8. A pressure vessel according to claim 6 characterized in that the height of the second annular contact zone is substantially between one and five times, and preferably close to three times the height of the intervening zone.

9. A pressure vessel according to claim 1, characterized in that the shells have smooth inner surfaces adjacent the annular rims thereof and opposite the portions of said retainer member defining the annular contact zones.

10. A pressure vessel according to claim 9, characterized in that the smooth inner surface of the first shell is of reduced diameter at the portion thereof adjacent the end of the retainer member on which the mouth of the bladder is mounted.

11. A pressure vessel according to claim 10, characterized in that said reduced diameter portion is connected to the adjacent portion of the first shell by an inclined annular region.

12. A pressure vessel according to claim 1, characterized in that the annular retainer member in cross section has a rectangular portion associated with the first shell, and a triangular portion associated with the second shell and the intervening space between the rims of said shells.

13. A pressure vessel in accordance with claim 12 characterized in that the inner surface of said second shell adjacent its rim has an annular notch defining an abutment shoulder in engagement with the apex of the triangular portion of said retainer member.

14. A pressure vessel according to claim 1, characterized in that the inner wall of the retaining member has two successive cylindrical portions with different diameters.

15. A pressure vessel according to claim 1, characterized in that the part of the retainer member having the relatively large mean thickness has an annular groove facing the first shell, the mouth of the bladder being mounted on the retaining member by engagement in said groove.

16. A pressure vessel according to claim 1, characterized in that the bladder is mounted on the retaining member at the end of the latter, which is closest to the closed end of the bladder.

17. A pressure vessel according to claim 1, characterized in that the bladder is mounted on the retaining member at the end of the latter which is farthest away from the closed end of the bladder.

* * * * *